US007338239B2

(12) United States Patent
Nelson et al.

(10) Patent No.: US 7,338,239 B2
(45) Date of Patent: Mar. 4, 2008

(54) SYSTEM AND METHOD FOR PARTITIONING CARGO AREAS

(75) Inventors: Roger Nelson, Rice Lake, WI (US); Chad Nelson, Rice Lake, WI (US)

(73) Assignee: FG Products, Inc., Rice Lake, WI (US)

( * ) Notice: Subject to any disclaimer, the term of this patent is extended or adjusted under 35 U.S.C. 154(b) by 0 days.

(21) Appl. No.: 11/693,292

(22) Filed: Mar. 29, 2007

(65) Prior Publication Data

US 2007/0166120 A1 Jul. 19, 2007

Related U.S. Application Data

(60) Continuation of application No. 11/083,041, filed on Mar. 17, 2005, now Pat. No. 7,214,017, which is a division of application No. 10/638,268, filed on Aug. 7, 2003, now Pat. No. 6,923,610, which is a continuation of application No. 09/909,484, filed on Jul. 20, 2001, now Pat. No. 6,626,625.

(60) Provisional application No. 60/219,534, filed on Jul. 20, 2000.

(51) Int. Cl.
*B60P 7/08* (2006.01)
(52) U.S. Cl. .................. 410/130; 410/129; 410/135; 410/140
(58) Field of Classification Search .......... 410/121, 410/129–131, 135, 140; 220/529–531, 534, 220/543, 544, 552; 296/24.4, 24.41
See application file for complete search history.

(56) References Cited

U.S. PATENT DOCUMENTS

| 723,231 | A | 3/1903 | Benedict |
| 1,061,974 | A | 5/1913 | Bohn |
| 1,193,255 | A | 8/1916 | Gibbs |

(Continued)

FOREIGN PATENT DOCUMENTS

DE 29820764 U1 11/1998

(Continued)

OTHER PUBLICATIONS

Trade Literature describing Randall Bulkhead Systems believed to have been offered for sale prior to Jul. 20, 2001.

(Continued)

*Primary Examiner*—Stephen Gordon
(74) *Attorney, Agent, or Firm*—Fish & Richardson P.C.

(57) ABSTRACT

An improved bulkhead and partition system in which at least two panels are independently attached to mounting members such that each panel can be moved independently. In a preferred embodiment, two bulkheads or panels are slidably attached to separate pairs of ceiling-mounted rails in a refrigerated trailer such that each bulkhead or panel can be independently slid toward the front of a trailer or toward the rear of a trailer to define, in cooperation with a removable center partition wall, a plurality of different cargo areas to be maintained at different temperatures. Alternatively, two bulkheads or panels may advantageously operate without a partition wall such that the panels may be placed side-by-side and fastened together to make a full-width bulkhead.

16 Claims, 7 Drawing Sheets

U.S. PATENT DOCUMENTS

| | | |
|---|---|---|
| 1,896,198 A | 2/1933 | MacMillan |
| 1,970,610 A | 8/1934 | McMullen et al. |
| 2,324,721 A | 7/1943 | O'Connor |
| 2,346,853 A | 4/1944 | Lundvall |
| 2,752,864 A | 7/1956 | McDougal, Sr. et al. |
| 2,866,419 A | 12/1958 | Candlin, Jr. |
| 2,895,431 A | 7/1959 | Ford |
| 3,017,843 A | 1/1962 | Loomis et al. |
| 3,057,248 A | 10/1962 | Learmont |
| 3,057,284 A | 10/1962 | Learmont |
| 3,070,044 A | 12/1962 | Tobin |
| 3,162,146 A | 12/1964 | Knippel et al. |
| 3,217,664 A | 11/1965 | Aquino et al. |
| 3,413,932 A | 12/1968 | Bennett |
| 3,438,149 A | 4/1969 | Ilg |
| 3,680,492 A | 8/1972 | Weage |
| 4,019,442 A | 4/1977 | Lee et al. |
| 4,049,311 A | 9/1977 | Dietrich et al. |
| 4,265,577 A | 5/1981 | Loomis |
| 4,281,870 A | 8/1981 | Ehrlich et al. |
| 4,639,031 A | 1/1987 | Truckenbrodt |
| 4,880,342 A | 11/1989 | Pradovic |
| 4,886,404 A | 12/1989 | Jensen et al. |
| 5,010,943 A | 4/1991 | Boyer |
| 5,161,848 A | 11/1992 | Lutton |
| 5,265,993 A * | 11/1993 | Wayne .................. 410/129 |
| 5,664,386 A | 9/1997 | Palmersten |
| 5,704,676 A | 1/1998 | Hill |
| 5,984,601 A | 11/1999 | Jevaney et al. |
| 6,017,175 A | 1/2000 | Kassab et al. |
| 6,247,740 B1 | 6/2001 | Smith |
| 6,626,625 B2 | 9/2003 | Nelson et al. |
| 6,923,610 B2 | 8/2005 | Nelson et al. |
| 7,195,435 B2 | 3/2007 | Clark |
| 7,214,017 B2 | 5/2007 | Nelson et al. |

FOREIGN PATENT DOCUMENTS

| | | |
|---|---|---|
| GB | 2238988 | 6/1991 |

OTHER PUBLICATIONS

Trade Literature describing Tempar Bulkhead Systems believed to have been offered for sale prior to Jul. 20, 2001.

Trade Literature describing ROM Bulkhead Systems believed to have been offered for sale prior to Jul. 20, 2001.

Trade Literature describing Bulkhead Seals believed to have been offered for sale prior to Jul. 20, 2001.

Trade Literature describing Donovan Bulkhead Systems believed to have been offered for sale prior to Jul. 20, 2001.

Trade Literature describing FG Products Bulkhead Systems believed to have been offered for sale prior to Jul. 20, 2001.

Trade Literature describing ISOWALL Insulation Partition Walls believed to have been offered for sale prior to Jul. 20, 2001.

Trade Literature describing LOAD-LOK Cargo Restraint Systems believed to have been offered for sale prior to Jul. 20, 2001.

Trade Literature describing Schmitz Cargobull Bulkhead Systems believed to have been offered to sale prior to Jul. 20, 2001.

* cited by examiner

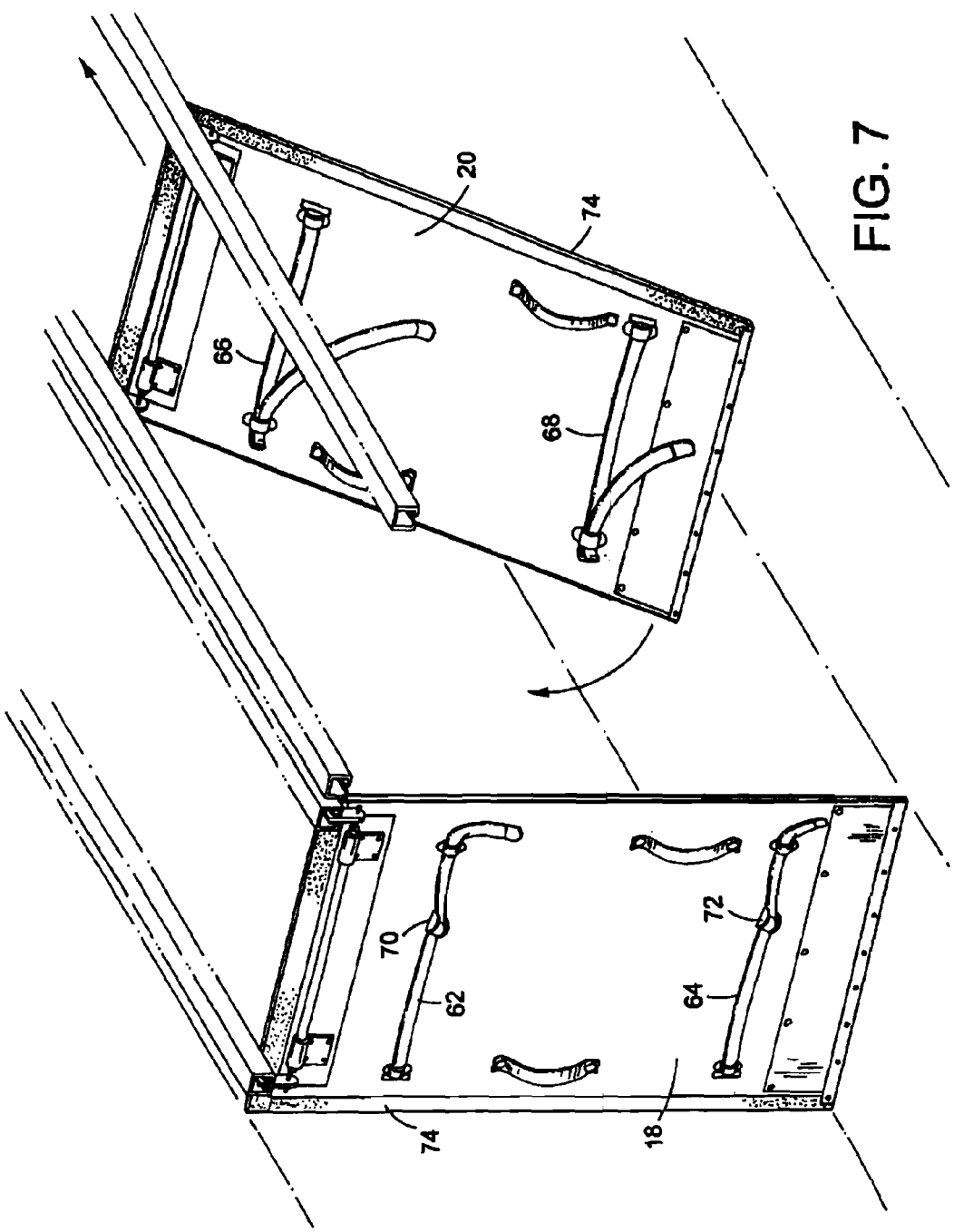

SYSTEM AND METHOD FOR PARTITIONING CARGO AREAS

CROSS-REFERENCE TO RELATED APPLICATION

This application is a continuation of U.S. application Ser. No. 11/083,041, filed on Mar. 17, 2005 now U.S. Pat. No. 7,214,017 by Nelson et al., which is a divisional of U.S. application Ser. No. 10/638,268, filed on Aug. 7, 2003 by Nelson et al., now U.S. Pat. No. 6,923,610, which is a continuation of U.S. application Ser. No. 09/909,484, filed on Jul. 20, 2001 by Nelson et al., now U.S. Pat. No. 6,626,625, which claims benefit to provisional patent application Ser. No. 60/219,534, filed on Jul. 20, 2000 by Nelson et al., the complete disclosures of which are incorporated herein by reference.

TECHNICAL FIELD

The present invention relates to movable partitions and panels, and, more particularly, to partitions and bulkheads which can be used to separate or insulate cargo during transportation or storage. The invention also relates to segregation of cargo into a plurality of areas that are maintained at different temperatures, commonly known as multi-temperature transport.

BACKGROUND

Perishable items such as produce and meat are often transported in refrigerated trailers, railcars, or ocean-going containers that can be transported on ships, trains or trucks. Such cargo transport devices are typically equipped with a refrigeration unit which conditions the air inside the cargo space, thereby maintaining desired temperatures and humidities during transportation or storage. Refrigerated trailers, railcars and containers are typically configured so as to enclose a single, large cargo space. Their refrigeration units will accordingly maintain the entire cargo space at the same temperature and humidity unless the cargo area is somehow divided. However, when the perishable cargo does not fill the entire trailer, cooling the entire cargo area is unnecessary and costly. It causes unnecessary strain and wear on the refrigeration unit, increases fuel consumption, raises transportation costs, and lengthens the time necessary to cool the perishable cargo after any temperature aberration.

Movable partitions and bulkheads having a specialized construction which permits the cargo space of trailers, rail cars, and containers to be readily divided into sections of varying sizes are known. Such bulkheads and partitions have been widely used to separate cargo areas for multi-temperature transport. The structure and configuration of partition and bulkhead systems differ somewhat depending on whether they are being deployed in a trailer, railcar, or container. Partitions currently used in refrigerated truck trailers typically extend from floor to ceiling and are generally comprised of modular wall sections. The modular sections are often mounted in channels or grooves on the trailer floor, held in place by friction, or otherwise mechanically fastened in place so as to compartmentalize trailers and truck bodies for multi-temperature food distribution. The panels are used to divide the trailer or body both longitudinally, along the long axis of the trailer, and laterally, across the width of the trailer. Some partition systems include panels that can be readily removed and placed along the sidewall of the trailer when not in use.

Insulated bulkheads are panels that extend across the width of a trailer to form separate fore and aft cargo areas. Like partitions, insulated bulkheads allow a refrigerated hauler to carry two or more loads at different temperatures within the same trailer or cargo container. For instance, bulkheads may be used to separate fresh food products from frozen or dry goods. Bulkheads are optionally equipped with walk-through doors similar to those used in partitions to permit ingress to and egress from each conditioned cargo area. Due to the functional similarities between bulkheads and panels, the latter are sometimes referred to as bulkheads.

SUMMARY

The present invention includes an improved partition system in which at least two panels are independently attached to one or more mounting assemblies such that each panel can be moved independently. In a preferred embodiment, two bulkheads or panels are slidably attached to separate pairs of ceiling-mounted rails in a refrigerated trailer such that each bulkhead or panel can be independently slid toward the front of a trailer or toward the rear of a trailer to define, in cooperation with a removable center partition wall, a plurality of different cargo areas to be maintained at different temperatures. In another preferred embodiment, two panels in the form of half-width bulkheads are releasably secured to one another and independently, slidably attached to ceiling of the trailer such that each half-width bulkhead can be independently raised and lowered with a minimum of fore and aft clearance.

BRIEF DESCRIPTION OF THE DRAWINGS

FIG. 7 is a perspective view of the panel shown in FIG. 6 being raised and moved independently.

Like reference numbers and designations in the various drawings indicate like elements.

DETAILED DESCRIPTION OF PREFERRED EMBODIMENTS

Figure 1:
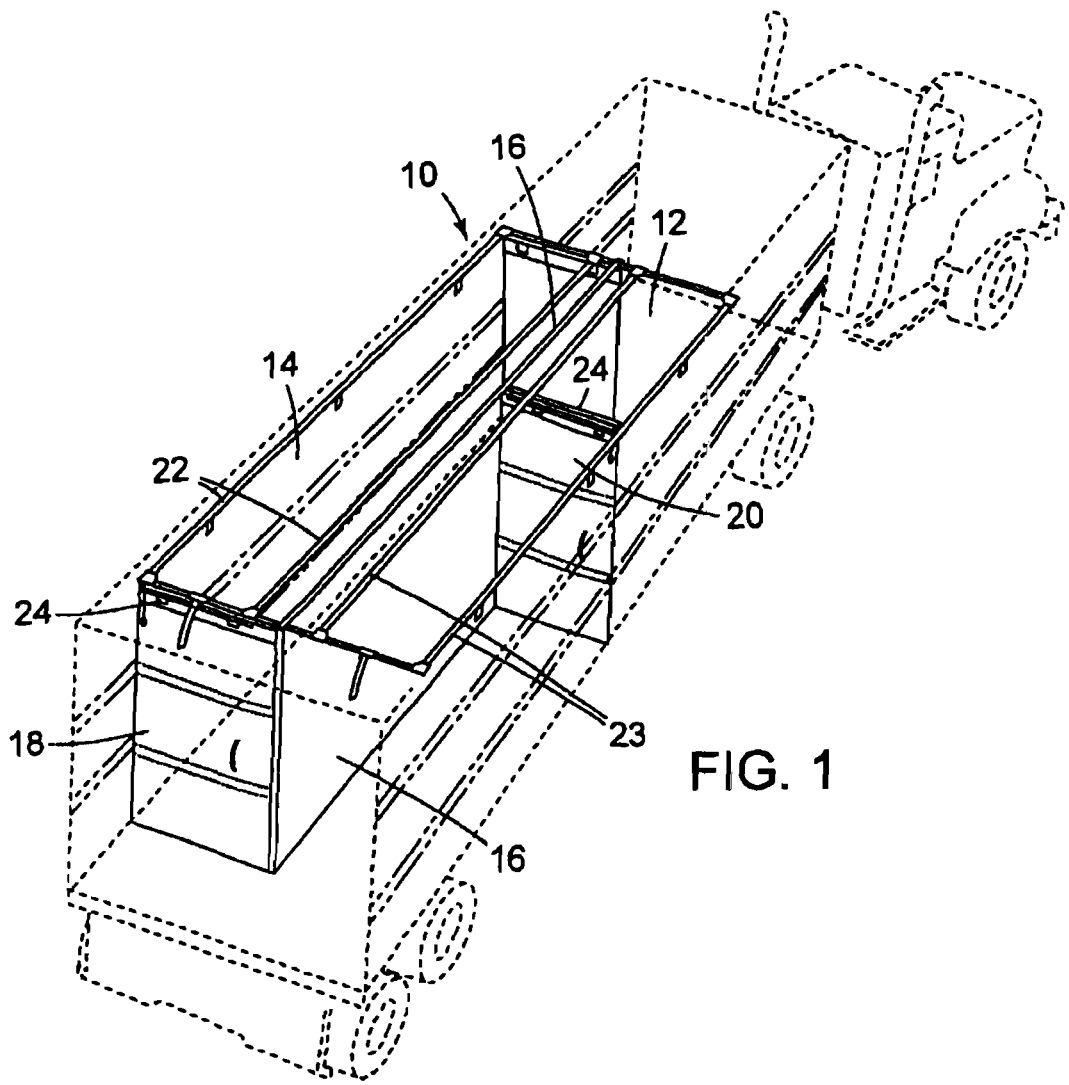
FIG. 1 is a perspective view of a trailer containing center partition panels extending along the long axis of the trailer, two horizontal panels, and a rail and trolley system for moving the horizontal panel in the axial direction.

Referring to FIG. 1, the trailer 10 encloses a cargo space. The cargo space is separated into a plurality of zones or areas 12, 14 that can optionally be maintained at different temperatures. Center partition panels 16 extend along the long axis of the trailer and separate the trailer into a left zone 12 and a right zone 14. The partition panels 16 can have various interfitting modular constructions, as is known in the art. Lateral panels 18, 20 extend laterally from the center partitions 16 to the left and right trailer walls. The right panel 20 is mounted forward of the left panel 18, thereby decreasing the volume of the right zone 14 relative to the left zone 12. Accordingly, the volume of air in the right zone 14 that must be temperature controlled is minimized, which in turn maximizes efficiency and reduces strain on the temperature control system.

Figure 4:
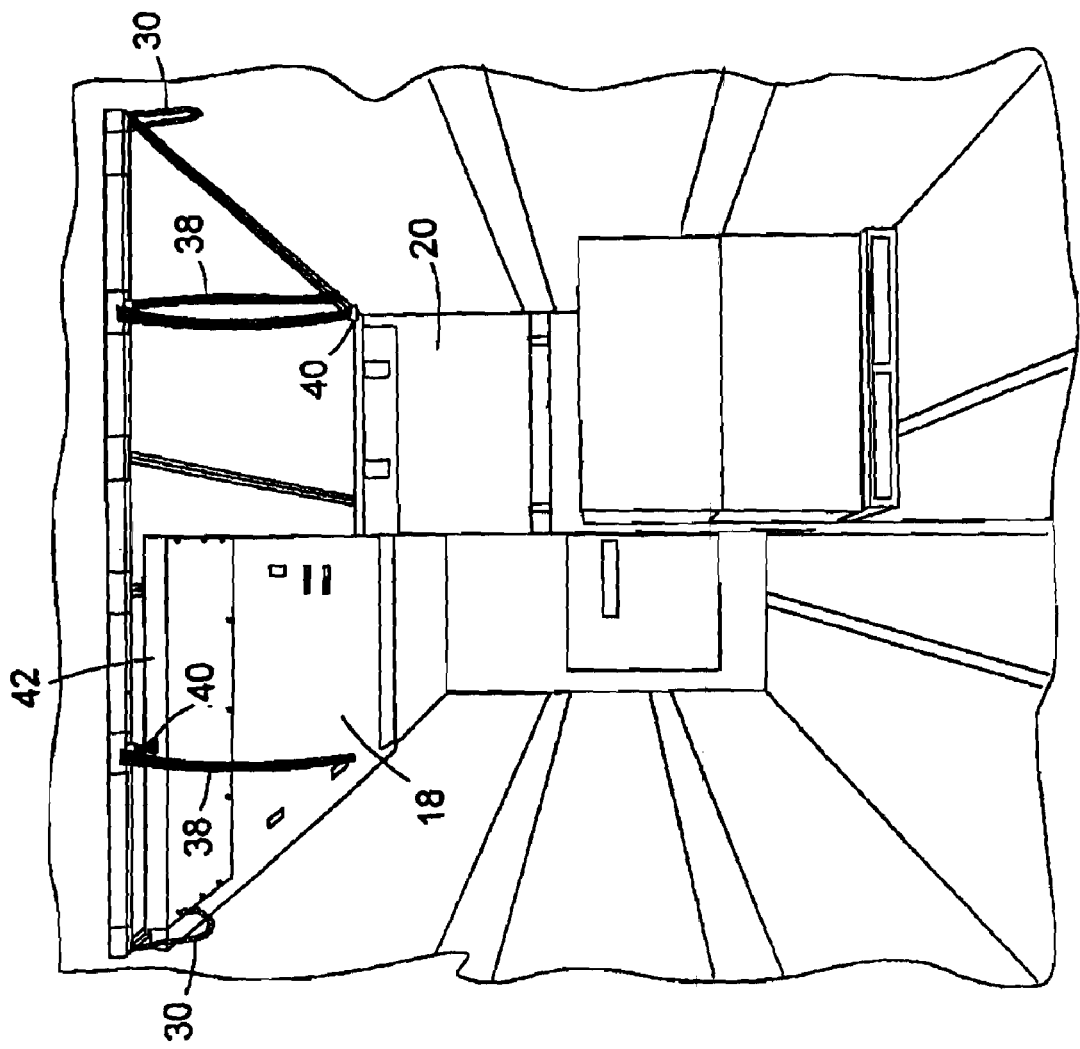
FIG. 4 is a perspective view of the rail systems, trolley assembly, and panel after the panel has been raised into a stowed position by a lift mechanism.

The panels 18, 20 are slidably attached to the rails 22 with a trolley assembly 24. The panels are hingedly attached to trolley assembly 24, and the trolley assemblies are slidably attached to the rails 22, 23. The trolley assemblies permit the panels 18, 20 to be moved in the fore and aft direction and to be "raised" like garage doors and secured to the ceiling when not in use, as shown in FIG. 4 and described in more detail below.

Those skilled in the art will appreciate that the panel, trolley assembly, and rail system can be implemented in a wide variety of configurations. For instance, the rails may be advantageously installed on the side walls of the trailer, thereby enabling the panels 18, 20 to open like a standard household door. The mounting assembly is preferably a trolley assembly, but may optionally be replaced with any mechanism that permits rotational, slideable, or hinged movement between the rails and the bulkhead. It is not necessary that the trolley or other mounting assembly permit continuous slidable movement of the bulkhead relative to the rails. Similarly, the rails may be replaced with other receiving members that cooperate with the selected mounting means. It is not necessary that the receiving means be unitary, continuous, or disposed along the long axis of the trailer. For instance, the receiving means can be a series of individual receptacles disposed along the ceiling of the trailer.

Figure 2:
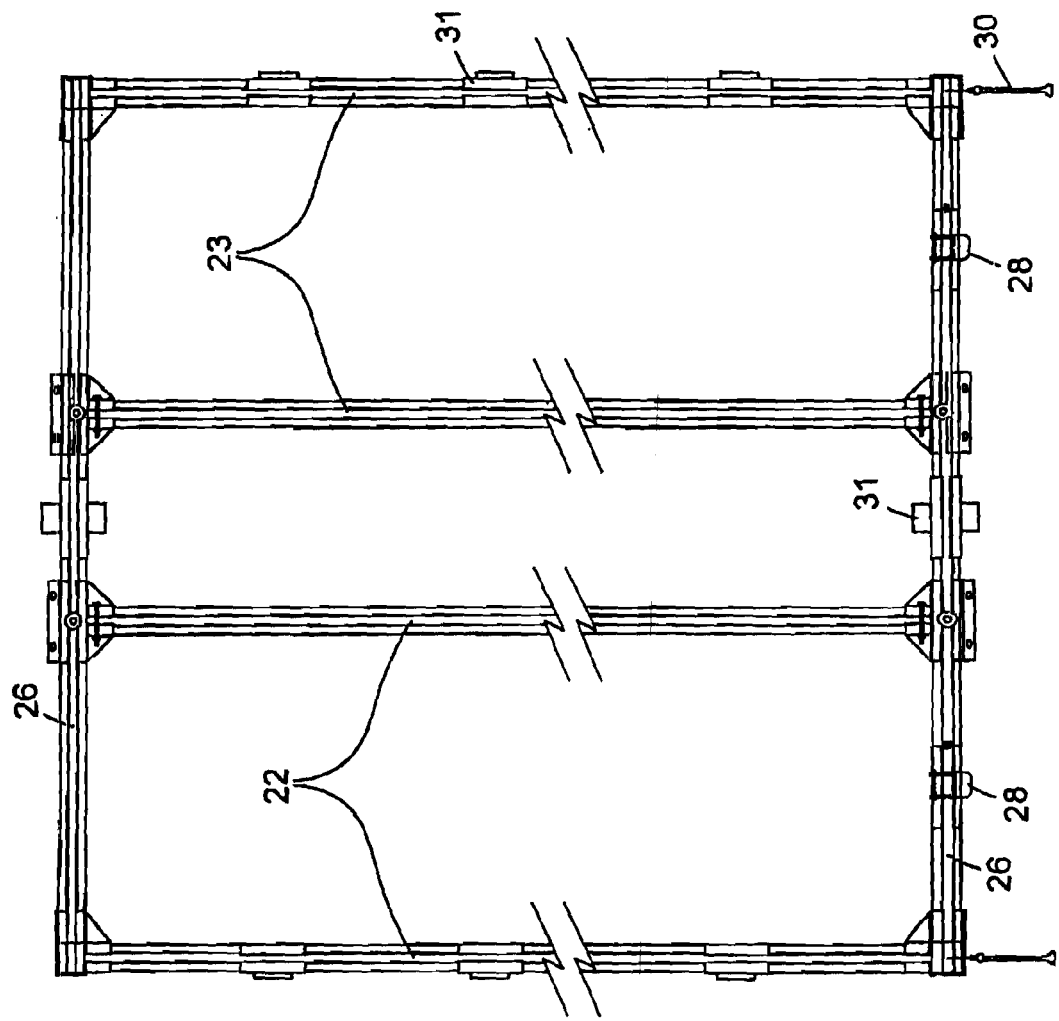
FIG. 2 is a plan view of rail system shown in FIG. 1.

FIG. 2 is a plan view of the rail assembly shown in FIG. 1. In the depicted embodiment, the receiving members comprise longitudinal rails 22, 23 having an internal channel adapted to receive a slidable member, preferably a roller. End rails 26 provide a mount for the ends of the longitudinal rails 22, 23 and also function as a trolley stop. Fixed to the end rails 26 are lift mechanisms 28 and safety chains 30, the functionality of which is described below. Mounting flanges 31 permit the rails to be fastened to the trailer walls or ceiling with standard fasteners.

Here again, various modifications can be readily made without departing from the invention. For instance, end rails 26 can be replaced with end caps or can be omitted entirely. The end rails 26 can also be advantageously replaced with half-width movable rails that span and slidably engage the two longitudinal rails on the left 22 and the two longitudinal rails on the right 23, respectively. Each moveable rail can be fitted with lift mechanisms 28 and safety chains 30 such that each moveable rail can be slid into position relative to each panel before each is lifted into an inoperative or stowed position. Additional longitudinal rails 22, 23 can be added to accommodate additional panels or panels of different widths.

Figure 3:
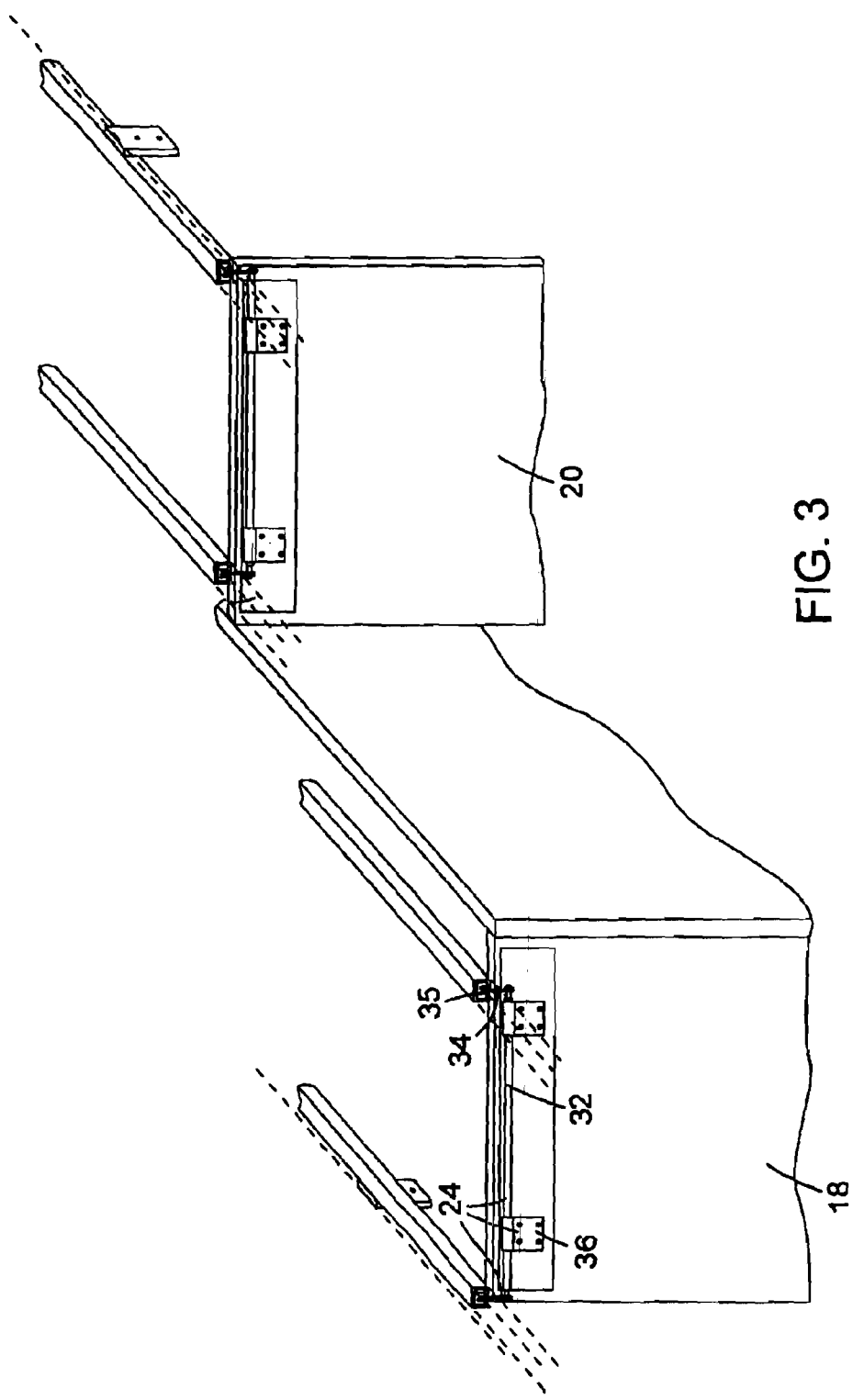
FIG. 3 is a perspective view of a rail system, trolley assembly slideably attached to the rail system, and a panel hingedly attached to the rail system.

FIG. 3 is a perspective view of the panels 18, 20, the trolley assembly 24, and the rails 22, 23. The trolley assembly consists of hinge plates 36 that are fixedly secured to the panels 18, 20, a hinge rod 32, and trolleys 34. The trolleys 34 serve to suspend the panel from the rails 22. Trolleys 34 include rollers 35 which permit the bulkhead to be slid into a desired longitudinal position, as shown in FIG. 1. The hinge mechanism 32, 36 permits the panel to rotate about the hinge rod 32, as shown in FIG. 4.

The panel is moved from the position shown in FIG. 3 to the position shown in FIG. 4 by lifting the bottom of the panel 18 up and to the rear of the trailer. The panel 18 is moved fore or aft, as needed, to position the base of the panel 18 proximate to the strap 38 having a hook 40. The hook 40 is secured to the base 42 of panel 18, preferably by attachment to a cooperating receptacle. The strap 38 is pulled downward to raise the base 42 of the panel to the ceiling of the trailer. The chains 30 can be attached to the base 18 of the panel to safeguard against unintended release of the panel 18 from the stowed position.

Referring to FIGS. 3 and 4, the assemblies may be advantageously modified to provide additional or different functionalities. The trolley assembly 32, 34, 36 can optionally be replaced with any known mounting mechanism that cooperates with the rails. The mounting means may comprise a post or flange integrally molded into the panel 18 and adapted to be received into the rails 22. As further examples, the mounting means may include i) a flat slidable member that engages an interior surface of the rail member and is hingedly attached to the bulkhead, ii) an integral, one piece, arcuate tab attached to the top of the bulkhead that can be inserted into one of a plurality of longitudinally arranged receiving means at a predetermined angle such that the tab locks the bulkhead into place as the bulkhead is lowered into a vertical position, iii) a hinge member that releasably locks into one of a plurality of longitudinally disposed receiving means, or iv) any other known mounting mechanism suitable for such mechanical attachment. Likewise, rails 22, 23 can be replaced with other mechanisms that cooperate with the selected mounting mechanism. For example, the rails 22, 23 may be replaced with a continuous rail having a plurality of axially disposed apertures for receiving cooperatively configured mounting means or a series of independently mounted receiving members for receiving cooperatively configured mounting means. As noted above, the rail members can optionally be mounted on a vertical surface, such as a trailer wall. Mounting members can thus be selected to enable the bulkheads to swing open like a door, slide in the axial direction in which the rail members are mounted, or be readily removed and reinstalled in another set of receiving members. The foregoing modifications are illustrative only and are not intended to comprise a comprehensive list of all modifications that can be made to the instant apparatus without departing from the invention.

Figure 5:
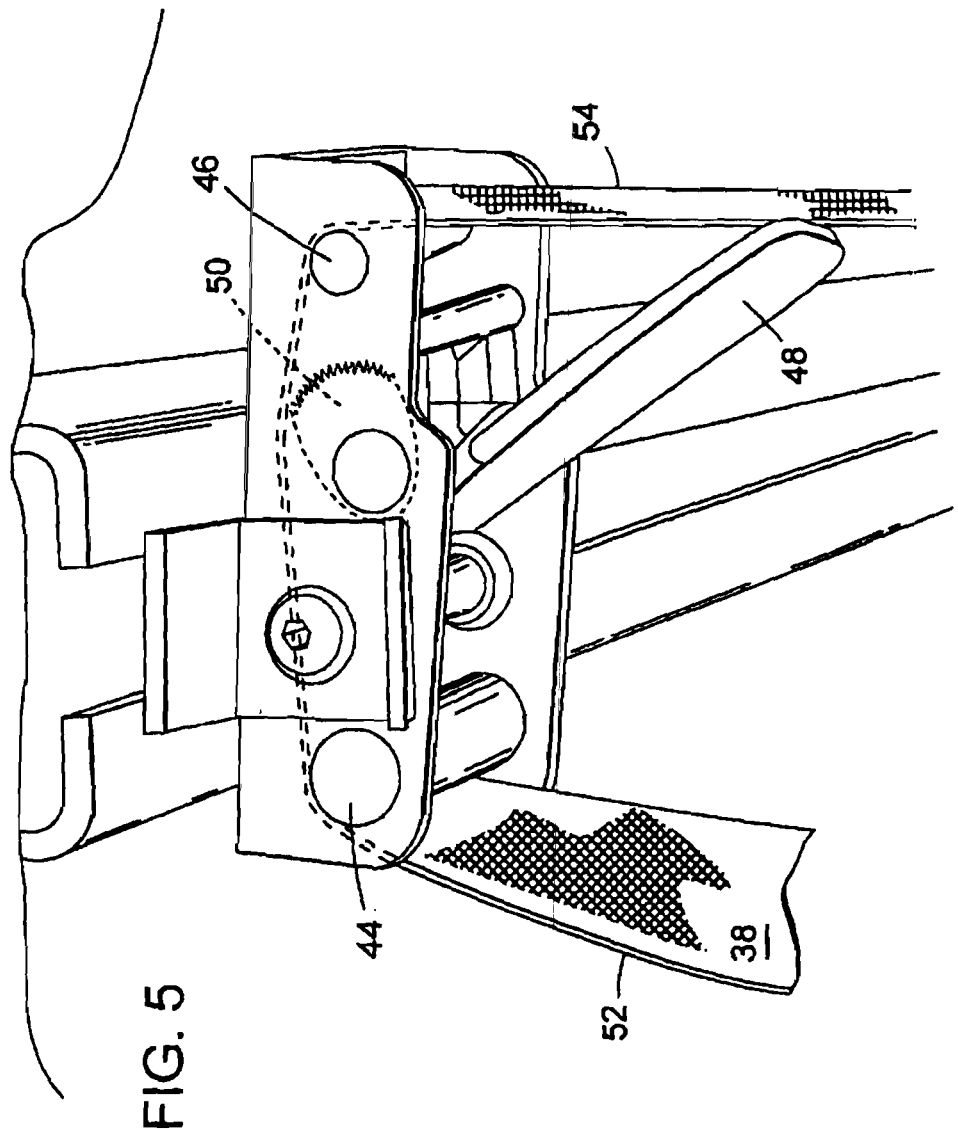
FIG. 5 is a perspective view of a lift mechanism.

FIG. 5 is a detailed view of the strap 38 and cooperating locking mechanism shown in FIG. 4. The strap 38 is positioned over guide pins 44, 46. Flange 48 is rigidly attached to cam 50. In use, the left portion 52 of the strap 38 is attached to the base 42 of the panel 18 either directly or through a suitable cooperating attachment means such as a hook and a mateable receptacle. The right portion 54 of the strap 38 is pulled downward until the panel 18 is in the desired stowage position. Then the flange 48 is forced upward by action of a spring (not shown), thereby forcing cam 50 against strap 38 and locking the strap in place. To lower the bulkhead 18, the right portion 54 of the strap 38 is pulled downward, which in turn forces flange 48 downward to the depicted, open position. The strap is then free to travel over guide pins 44, 46 as long as the right portion of the strap is maintained in the depicted, vertical position in substantial tension, which holds flange 48 in the open position. When the end of the strap portion 54 is raised upwards and to the rear of the trailer, spring force causes the flange and cam assembly to rotate counterclockwise, causing the cam 50 to lock the strap 38 in place. Accordingly, the base 42 of the bulkhead 18 is lowered toward the floor of the trailer by holding the strap portion 54 in a vertical position as the strap is pulled over pins 44, 46 by the weight of the bulkhead.

Figure 6:
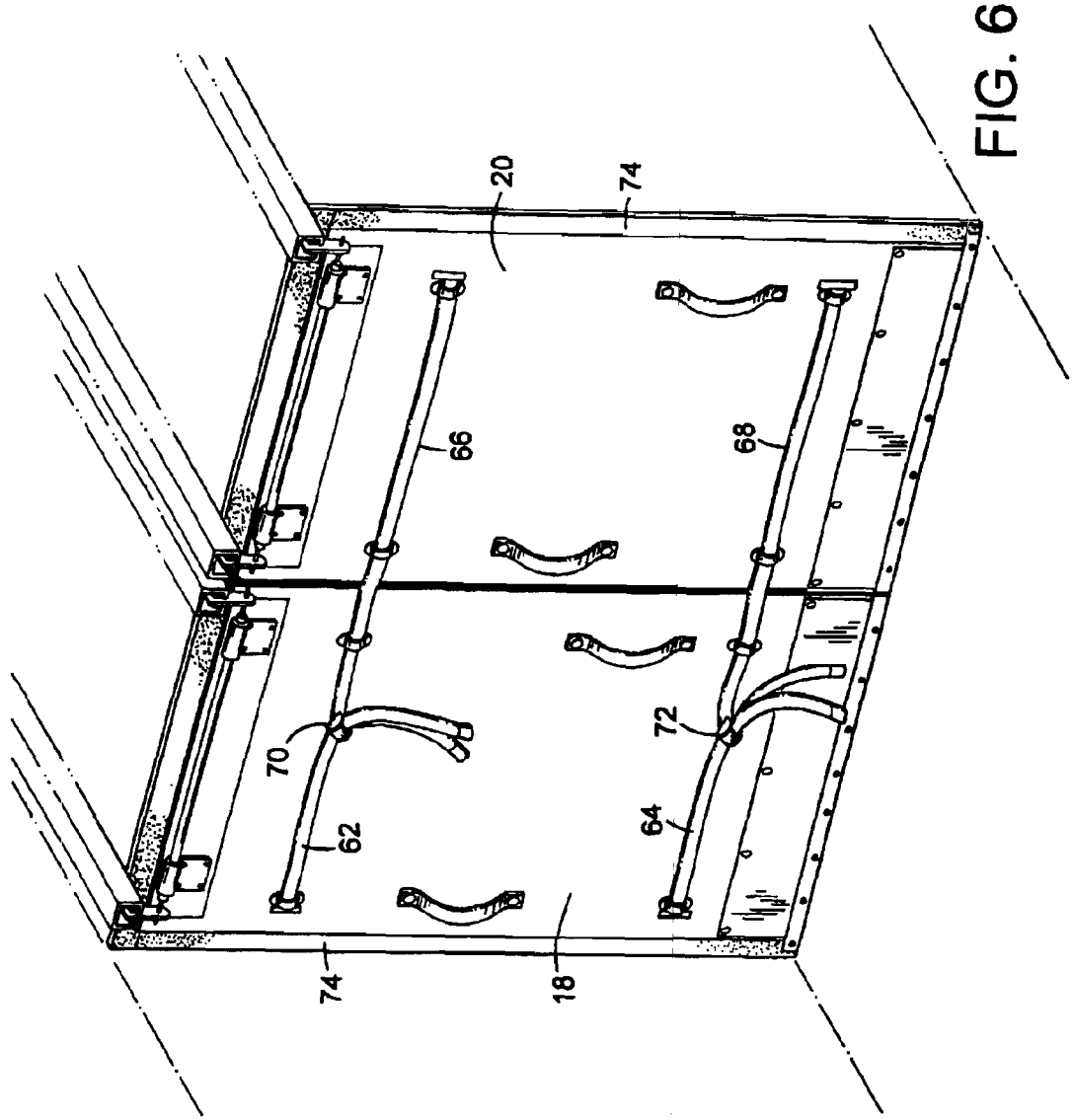
FIG. 6 is a perspective view of two panels placed side-by-side to make a full-width bulkhead.

The panels 18 and 20 may be advantageously used without center partition panels 16, as illustrated in FIG. 6.

The panels may be placed side-by-side and fastened together to make a full-width bulkhead. The panels 18 and 20 may be secured relative to one another with a variety of known means. In this implementation, the panels 18 and 20 are secured by straps 62, 64, 66, and 68, and buckles 70 and 72. Alternatively, the panels can be secured with cooperating channels, grooves, flanges, polymeric seals, locking pins, or the like. The panels 18 and 20 may also be equipped with coated nylon seals 74 along the peripheral edges to enhance the seal between the panels 18 and 20 when fastened together.

FIG. 7 illustrates how a user can advantageously separate the panels 18 and 20 by releasing straps 66 and 68 from buckles 70 and 72. The top one of either panel 18 or 20 can be slid forward as the bottom is raised rearwardly (indicated by the arrows) permitting the panel to be lifted and stowed even when pallets and cargo are stacked close to the panel.

The panels of the instant invention may be secured relative to one another with a variety of known means. For instance, the panels can be equipped with cooperating straps and buckles. The panels can alternately be equipped with cooperating channels, grooves, flanges, polymeric seals, or locking pins.

A number of embodiments of the present invention have been described. Nevertheless, it will be understood that various additional modifications may be made without departing from the spirit and scope of the invention. Accordingly, other embodiments are within the scope of the following claims.

What is claimed is:

1. A method for using panels in a cargo space of a trailer, comprising:
    arranging first and second panels in a cargo space of a trailer to a first operative position so that the first and second panels are positioned laterally to one another in the cargo space, each of the first and second panels extending in a direction generally perpendicular to a longitudinal axis of the trailer, and each of the first and second panels being coupled to a mounting system that is attached to at least one of a wall or a ceiling of the cargo space;
    releasably securing the first and second panels together in a side-by-side configuration when the first and second panels are arranged in the first operative position so that the first and second panels form a full-width bulkhead panel in the cargo space;
    releasing the first and second panels from the secured, side-by-side configuration; and
    independently moving the first panel relative to the second panel in the cargo space, the first panel having a first degree of freedom to be moved independently from the second panel in a longitudinal direction, and the first panel having a second degree of freedom to be raised independently from the second panel.

2. The method of claim 1, further comprising independently moving the second panel relative to the first panel in the cargo space, the second panel having a first degree of freedom to be moved independently from the first panel in a longitudinal direction, and the second panel having a second degree of freedom to be raised independently from the first panel.

3. The method of claim 1, wherein when the first and second panels are arranged in the first operative position, the first and second panels extend in a substantially vertical direction in the cargo space.

4. The method of claim 1, wherein independently moving the first panel relative to the second panel comprises hingedly raising the first panel toward the ceiling of the cargo space.

5. The method of claim 4, wherein independently moving the first panel relative to the second panel comprises hingedly raising the first panel into a stowed position.

6. The method of claim 1, wherein when the first and second panels are arranged in the first operative position, the first and second panels abut one another along adjacent peripheral edges of the panels.

7. The method of claim 6, further comprising releasably securing the first and second panels together in the side-by-side configuration using straps when the first and second panels are arranged in the first operative position.

8. The method of claim 1, wherein the mounting system comprises at least one trolley and at least one rail.

9. The method of claim 1, wherein the mounting system comprises at least one hinge mechanism.

10. The method of claim 1, further comprising pulling on a strap coupled to the first panel so as to raise the first panel toward the ceiling of the cargo space.

11. The method of claim 10, wherein the strap is coupled to a lower portion of the first panel and the mounting system is coupled to an upper portion of the first panel.

12. The method of claim 10, further comprising operating a locking mechanism to retain the strap when the first panel is raised toward the ceiling of the cargo space.

13. The method of claim 12, wherein the locking mechanism comprises a cam that adjusts to retain the strap in a fixed position.

14. The method of claim 1, wherein when the first and second panels are releasably secured together, the first and second panels seal together along adjacent peripheral edges of the panels to form the full-width bulkhead panel.

15. The method of claim 1, further comprising operating a lift mechanism to raise the first panel in a stowed position proximate the ceiling of the cargo space, wherein the lift mechanism comprises a locking cam and at least one of a strap or a rope.

16. The method of claim 15, wherein the strap or the rope is coupled to the first panel proximate a lower edge, the lift mechanism being operated by pulling on the strap or the rope so as to raise the lower edge of the first panel toward the ceiling of the cargo space.

* * * * *